US006553449B1

(12) United States Patent
Dodd et al.

(10) Patent No.: US 6,553,449 B1
(45) Date of Patent: Apr. 22, 2003

(54) SYSTEM AND METHOD FOR PROVIDING CONCURRENT ROW AND COLUMN COMMANDS

(75) Inventors: James M. Dodd, Shingle Springs, CA (US); Michael W. Williams, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 09/675,348

(22) Filed: Sep. 29, 2000

(51) Int. Cl.$^7$ ............................................. G06F 12/00
(52) U.S. Cl. ........................................... 711/5; 711/168
(58) Field of Search .............................. 711/5, 105, 168

(56) References Cited

U.S. PATENT DOCUMENTS

| 5,511,024 | A | | 4/1996 | Ware et al. | |
|---|---|---|---|---|---|
| 5,991,232 | A | * | 11/1999 | Matsumura et al. | ........ 365/201 |
| 6,151,239 | A | | 11/2000 | Batra | |
| 6,154,821 | A | | 11/2000 | Barth et al. | |
| 6,185,644 | B1 | | 2/2001 | Farmwald et al. | |
| 6,320,800 | B1 | * | 11/2001 | Saito et al. | ............ 365/230.03 |
| 6,381,671 | B1 | * | 4/2002 | Ayukawa et al. | ............ 711/100 |

* cited by examiner

Primary Examiner—Kevin Verbrugge
(74) Attorney, Agent, or Firm—Pillsbury Winthrop LLP

(57) ABSTRACT

A system and method for providing concurrent column and row operations in a memory system is provided. The memory system includes a memory controller, a plurality of memory devices, and communication paths between the memory controller and the plurality of memory devices. The memory controller is coupled to each memory device through a communication path that provides a column chip select signal to the memory device and a communication path that provides a row chip select signal to the memory device. The dual chip select signals allow a column operation to be carried out in the memory device simultaneously with a row operation in the memory device. The communication paths further include a column command communication path that provides column commands to the memory devices, a column address communication path that provides column addresses for the column commands to the memory devices, a row command communication path that provides row commands to the memory devices, and a row address communication path that provides row addresses for the row commands to the memory device.

18 Claims, 6 Drawing Sheets

SYSTEM AND METHOD FOR PROVIDING CONCURRENT ROW AND COLUMN COMMANDS

BACKGROUND OF THE INVENTION

1. Field of the Invention

The present invention generally relates to a memory system, and in particular, to a system and method for providing concurrent row and column commands in a memory system using separate device selection mechanisms.

2. Related Art

A typical memory system includes a memory controller and memory devices, such as dynamic random access memory (DRAM) devices, coupled thereto. In some systems, a processor performs memory controller functions. As used herein, the term memory controller includes such a processor. The memory devices are usually placed on memory modules, and the modules are connected to the memory controller through a memory interface. The memory interface provides communication between the memory controller and the memory devices. For example, the memory interface may contain chip select lines, address bus lines, command signal lines, and data bus lines.

Increasing demand for higher computer performance and capacity has resulted in a demand for faster and more efficient memory systems. When instructions from a central processing unit (CPU) of a computer are carried out, information and data are constantly transmitted from the memory controller to the memory devices, and vice versa. Intense read and write traffic in a memory system often results when the computer is under a heavy workload and simultaneously running several applications. Because data is constantly moving between the memory controller and the memory device, one way to increase the efficiency of a memory system is to improve data bandwidth in the data bus lines and command bandwidth in the command signal lines. The data bandwidth and command bandwidth can be thought of as the amount of data and command being sent from the memory controller to the memory device, or from the memory device to the memory controller, at a given time, respectively.

Even though some prior art memory systems, such as a Double Data Rate-Synchronous DRAM (DDR) system, have a peak data bandwidth of about 1.6 gigabytes per second, these prior memory systems typically achieve only about 65% efficiency on most computer applications. This is partly the result of the memory controller having to spend time waiting for the memory devices to be ready for an operation before the memory controller can issue another command. For example, before a DDR system can do a read operation, the portion of the memory devices containing the data to be read must be pre-charged and activated. After pre-charging and activating the applicable portion, there is a timing constraint in which the DDR system must wait before the next operation on the portion can be initiated. This timing constraint is commonly known as tRCD, which stands for Row to Column Decode time or delay.

FIG. 1 shows an illustrative example of a timing diagram of a prior art DDR system. In this example, the DDR system desires to read from two separate sub-arrays in a memory device. The top signal in the timing diagram represents a single chip select signal 10 to that memory device. The bottom signal in the timing diagram represents command signals 20 issued from the memory controller. While the chip select signal 10 is low, the memory device is selected by the memory controller to perform the applicable commands. Here, the memory controller sends out a first read command 22 to read data from a first sub-array of the memory device, a pre-charge command 23 and an activate command 24 to pre-charge and activate a second sub-array of the memory device, and a read command 28 to read data from a second sub-array of the memory device. The timing of commands shown are illustrative in nature since the clock counts of the timing relationships depend on a number of factors, including speed grade of the device, frequency of operation, amount of memory populated. Because of intrinsic limitations in the DDR memory system, the read and pre-charge commands 22, 23 can only be performed sequentially. The length of a timing block 26 represents the timing constraint tRCD that the system must wait before the second read command 28 to the second sub-array can be initiated. Because the DDR system has to carry out these commands sequentially and wait for the tRCD to elapse before the second command can be initiated, data bus lines between the memory devices and the memory controller remain empty between transmitting data read from the first read command and transmitting data read from the second read command. The data bus lines are unused during the pre-charge period, the activate period and the tRCD timing constraint. As the result, the data bus lines are not efficiently used, and data bandwidth suffers.

In other memory systems, such as a Rambus DRAM (RDRAM) system, solutions have evolved to increase the efficiency of data bandwidth. In the RDRAM system, instead of sending a command from a memory controller to a memory device in one clock, the commands are organized in a packet format. The command packet is sent to memory devices in multiple clocks, usually in eight clock edges, with each clock edge being used to send a portion of the packet. The command packet, with its large size, is able to encode information that allows row and column commands to be carried out concurrently, as opposed to sequentially as in a DDR system. For example, pre-charge or activate is a row command, and read is a column command. This improves command bandwidth and allows data bandwidth to be used more efficiently. However, because multiple clocks are needed to transmit the packet, certain delay is introduced. For example, in a 400-megahertz system, eight clock edges would require 10 nanoseconds to send the command packet. Therefore, there is a need for a system and method to provide concurrent row and column commands that would improve data bandwidth but would not introduce delay.

DETAILED DESCRIPTION

Figure 1:
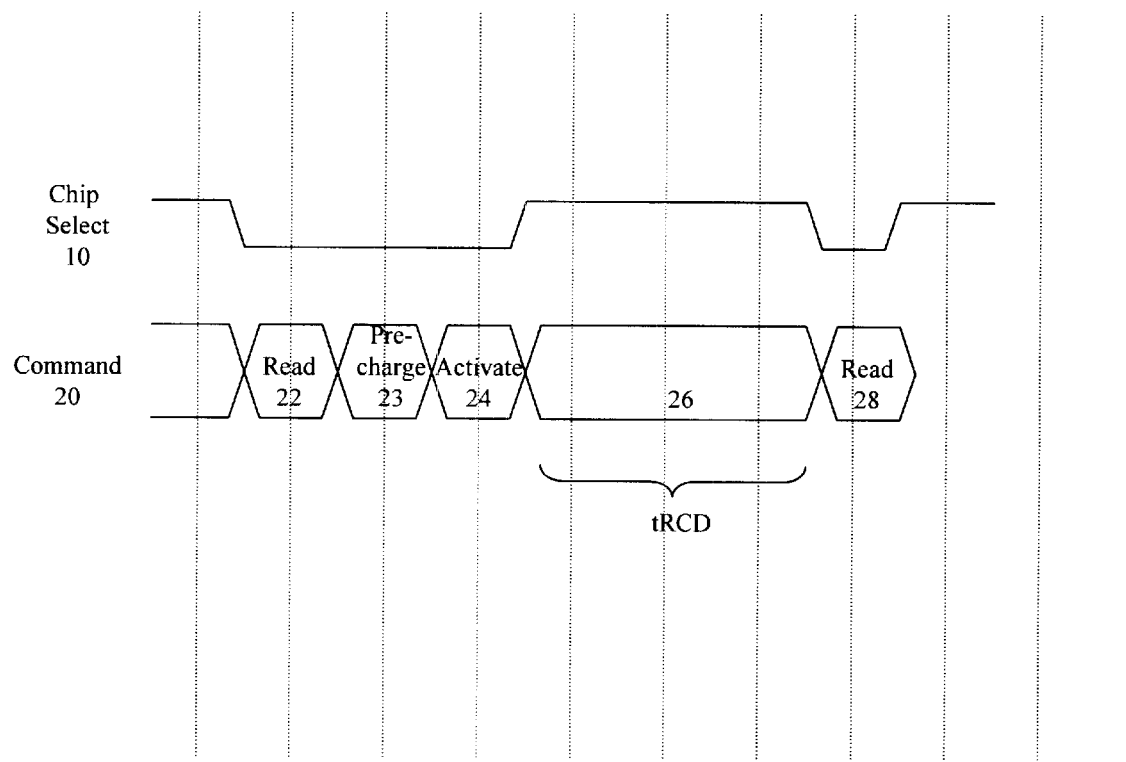
FIG. 1 shows an illustrative example of a timing diagram of a prior art DDR system.
Figure 2:
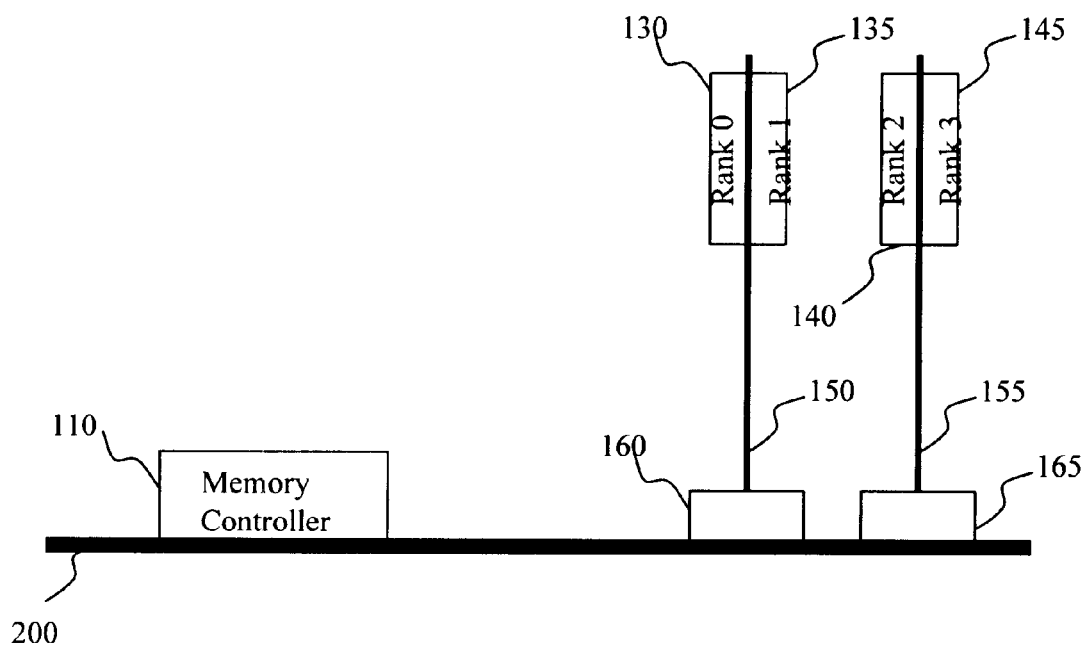
FIG. 2 depicts a memory system at a motherboard level, in which embodiments of the present invention may function.

FIG. 2 depicts a memory system at a motherboard level, in which embodiments of the present invention may function. The memory system comprises a memory controller 110 and memory devices 130–145, such as DRAM devices. The memory controller 110 may, for example, be a chipset or central processing unit, and it is adapted to transmit different information—e.g., data, address information, and command information—to the memory devices 130–145. The memory controller 110 is further adapted to receive data and status information from the memory devices 130–145. In the memory system, the memory controller 110 resides on a motherboard 200. The memory devices 130–145 reside on memory modules 150, 155. The memory modules 150, 155 are connected to the motherboard 200 through connectors 160, 165. The memory devices 130, 135 reside on the first memory module 150, while the memory devices 140, 145 reside on the second memory module 155. In other memory systems in which the present invention may function, the configuration of the memory devices 130–145 on the memory modules 150, 155 may be different, and the memory controller 110 may control more or fewer memory devices than those shown in FIG. 2. An external buffer(s) or register(s) (not shown) may also be placed between the memory controller 110 and the memory devices 130–145 in the memory system to reduce the impedance seen by the memory controller 110 and improve electrical characteristics of the memory system.

Each of the memory devices 130–145 can be thought of as a memory array with a table of cells. These cells are comprised of tiny capacitors that hold charge, and contain one or more bits of data, depending upon the configuration of the memory devices 130–145. Each of the memory devices 130–145, as shown in the motherboard level in FIG. 2, is referred to as a logical row of memory in the motherboard, or a rank ("Rank"). As illustrated, the memory device 130 is Rank 0, the memory device 135 is Rank 1, the memory device 140 is Rank 2, and the memory device 145 is Rank 3. Oftentimes, the memory cell array within each Rank is further divided into a number of sub-arrays. Each of these sub-arrays is called a bank ("Bank"). In a memory device level, each bank is divided into arrays of memory cells and can be thought of as a memory cell sub-array having N rows of memory, with each row divided into M columns.

Figure 3:
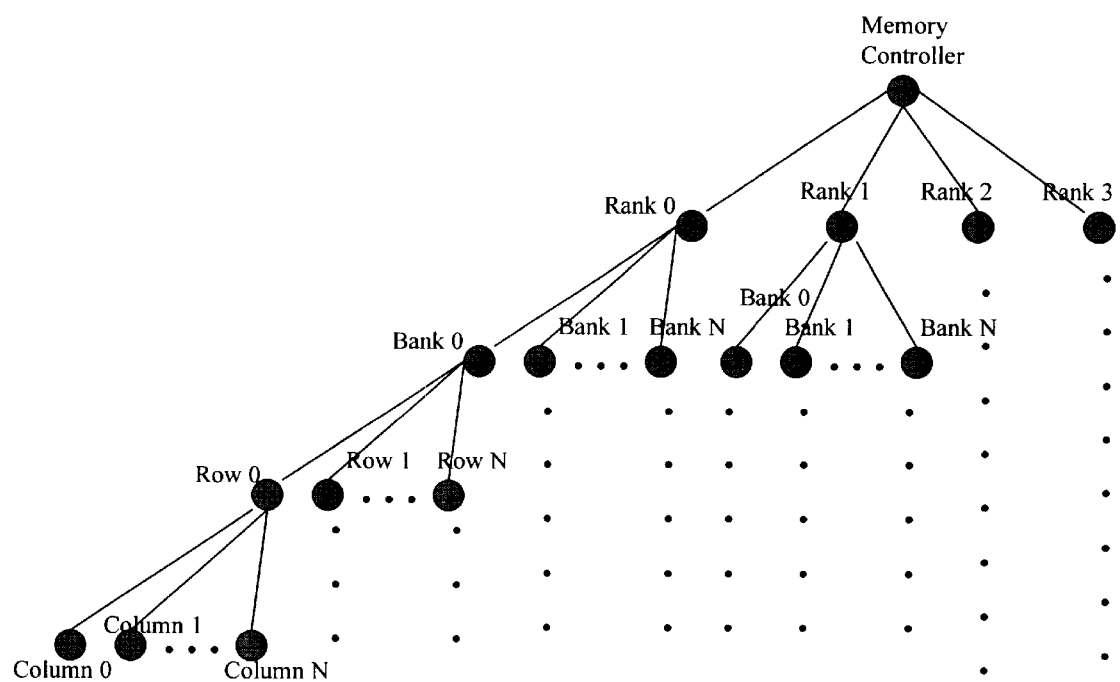
FIG. 3 shows a representation of the hierarchical structure of the memory system in FIG. 2.

FIG. 3 shows a representation of a hierarchical structure of the memory system in FIG. 2. Signals travel from the memory controller 110 to components within the memory devices 130–145 through the hierarchy. On top of the hierarchy is the memory controller 110. The second level of the hierarchy consists of Ranks, for example, Ranks 0–3 in the embodiment. In other embodiments, there may be X Rank(s), where X is an integer. On the third level of the hierarchy are Banks. In the embodiment, each Rank is divided in a number of Banks, for example, Banks 0–Y, where Y is an integer. Rank 0 has Banks 0–Y, and so do each of Ranks 1–3. The third level of the hierarchy includes rows for each Bank in each Rank ("Row"). Assuming that each Bank has N rows of memory, where N is an integer, each Bank of each Rank will be associated with Rows 0–N. For example, Rank 0, Bank 0 is associated with Rows 0–N of Rank 0, Bank 0. The fourth level of the hierarchy includes columns for each Row of each Bank in each Rank ("Column"). Assuming that each Row has M columns of memory cell, where M is an integer, each Row of each Bank of each Rank will be associated with Columns 0–M. For example, Rank 0, Bank 0, Row 0 is associated with Columns 0–M of Rank 0, Bank 0, Row 0. It is plausible to define a memory system where Ranks are not further subdivided into Banks, where the third level of the hierarchy includes columns while the fourth level of the hierarchy structure includes rows, or where Ranks are subdivided with different number of Banks, Rows, and/or Columns.

Figure 4:
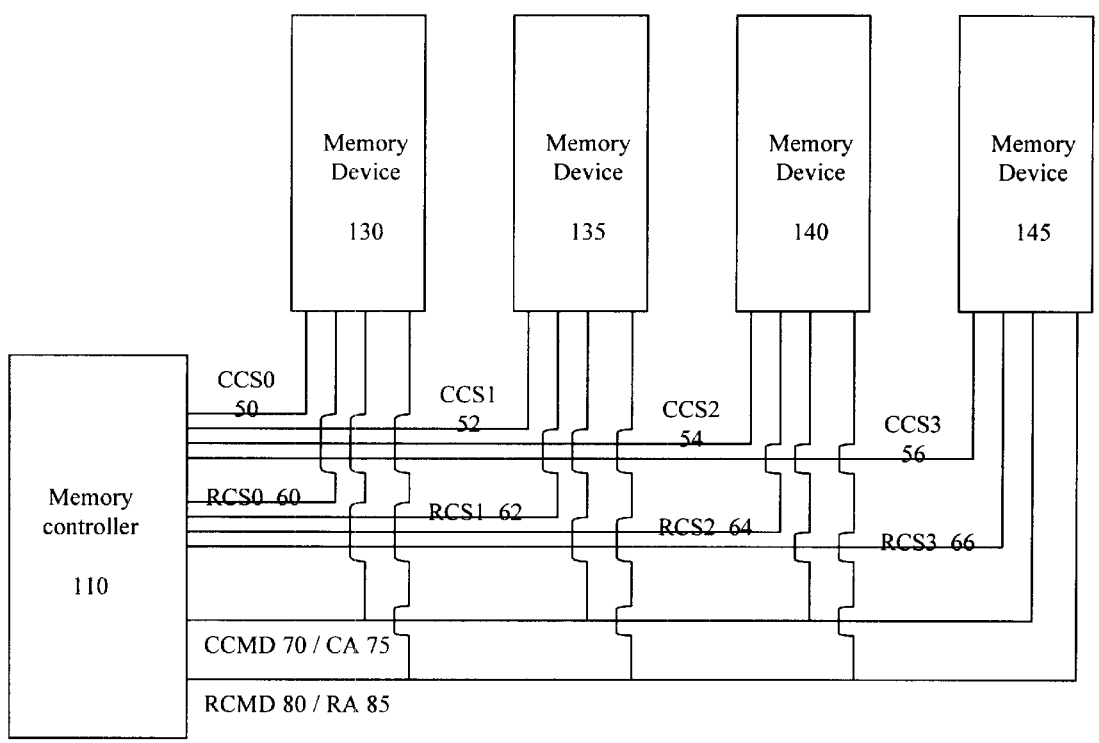
FIG. 4 illustrates a memory system according to an embodiment of the present invention.

FIG. 4 illustrates a memory system according to an embodiment of the present invention. The memory system comprises a memory controller 110, memory devices 130–145, and communication lines coupling the memory controller 110 to the memory devices 130–145. In other embodiments, there may be more or fewer memory devices than those shown in FIG. 4. The communication lines include signal lines for a column chip select 50 (CCSO) and a row chip select 60 (RCSO) connected to the memory device 130, or Rank 0. Signal lines for column chip selects 52, 54, 56 (CCS1, CCS2, CCS3) and row chip selects 62, 64, 66 (RCS1, RCS2, RCS3) are also provided to the memory devices 135, 140, 145 (or Rank 1, 2, 3), respectively. The chip select hereto refers to any type of signal that selects a specific memory device, specific portion of a memory device, or a group of memory devices. It can be thought of as a signal that causes the selected device(s) or portion(s) to take notice of command inputs. In this embodiment, there are two chip selects—a column chip select and a row chip select—per memory device, or per Rank, for a total of eight chip selects in the memory system. In other embodiments, there may be more or fewer chip selects because the number of the memory devices or the number of chip selects per memory device may vary. The communications lines further include buses for transmitting column commands 70, column addresses 75, row commands 80, and row addresses 85. Each of these four signal/bus lines broadcasts its signals to all the memory devices 130–145. For the sake of clarity, buses for transmitting the column commands 70 and the column addresses 75 are shown as one bus in FIG. 4, and buses for transmitting row commands 80 and row address 85 are shown as one bus in FIG. 4. In other embodiments, individual signal/bus lines for column commands, column addresses, row commands, and row addresses are provided to each memory devices or Rank to allow separate control of the individual memory devices 130–145.

The dual chip selects on a memory device, or a Rank, are for the two types of operations in the memory devices 130–145: row operations and column operations. A row operation may be thought of as an operation that relates to or affects rows of the memory array of the memory devices 130–145, or an operation that involves the selection or utilizing of a row or rows of the memory array. Examples of a row operation includes a pre-charge operation and an activate operation. The pre-charge operation basically prepares the Bank(s) for a read operation. Before a read operation, the pre-charge operation pumps up charges on bit lines within a sub-array of the memory device, which is often called a Bank. The activate operation then selects a particular row of the sub-array, which contains data to be read, and puts the contents of the particular row into a page register. From the page register, the data to be read is extracted for sending to the memory controller 110, via the data bus lines.

Examples of a column operation include a read operation and a write operation. Variants of the read and write operations, such as a read without pre-charge, are also considered column operations. In order to read from a particular row of the sub-array of the memory device 130, the bit lines shared between multiple rows of a Bank containing the particular row must first be pre-charged if they have not been pre-charged. The particular row of the sub-array may also need to be activated after pre-charge. After the row commands pre-charge and activate are preformed, the data to be read resides in the page register, where it is ready to be read. A column command read is then issued to read columns of the page register, selecting and extracting the piece of the data stored in the page register that contains the data to be read. If another piece of data stored in the page register is needed next, another column command read is issued. No pre-charging or activation is needed because the page register already contains the data needed. However, if the next piece of data requested for a read is stored in another row of the sub-array or in another sub-array, the memory system may need to pre-charge bit lines and activate the other row before data can be read from the other row. For example, the memory system may request to read first from Rank 0, Bank 0, Row 0 and then from Rank 0, Bank 1, Row 2. If the page register for Rank 0, Bank 1 is currently occupied, then pre-charging is required. If pre-charge has already been done and the page register for Rank 0, Bank 1 is not currently occupied, then only activation of Row 2 is required. The process of using a combination of row commands and column commands is repeated until all data requested are received. A write operation is similarly carried out through a combination of row commands and column commands.

Having the dual chip selects per memory device (or Rank) and providing column commands 70, column addresses 75, row commands 80 and row addresses 85 allow the memory system to provide and carry out concurrent row and column commands. With a configuration as shown in FIG. 4, the memory controller 110 is able to provide a RCSO 50, a CCSO 60, column commands 70, column addresses 75, row commands 80 and row addresses 85 to the memory device 130, or Rank 0, all at once. The ability to send RCSO 50 and CCSO 60 concurrently allows the memory system to perform concurrent row and column commands in the memory device 130, or Rank 0. In the prior art DDR memory system, only one chip select is provided to either perform a row operation or a column operation at a time. Unlike in the DDR memory system, where a row operation and a column operation must be performed separately and sequentially, embodiments of the memory system according to the present invention allow for concurrent row and column operations. For example, a memory system of the present invention may wish to perform a column command to read a first portion of the memory arrays in Rank 0 while performing a row command to pre-charge a second portion of the memory arrays in Rank 0 to prepare the second portion for a subsequent read. This increases the command bandwidth, which in turn increases the data bandwidth because more commands issued at a time translates into more data being transferred during that time.

Figure 5:
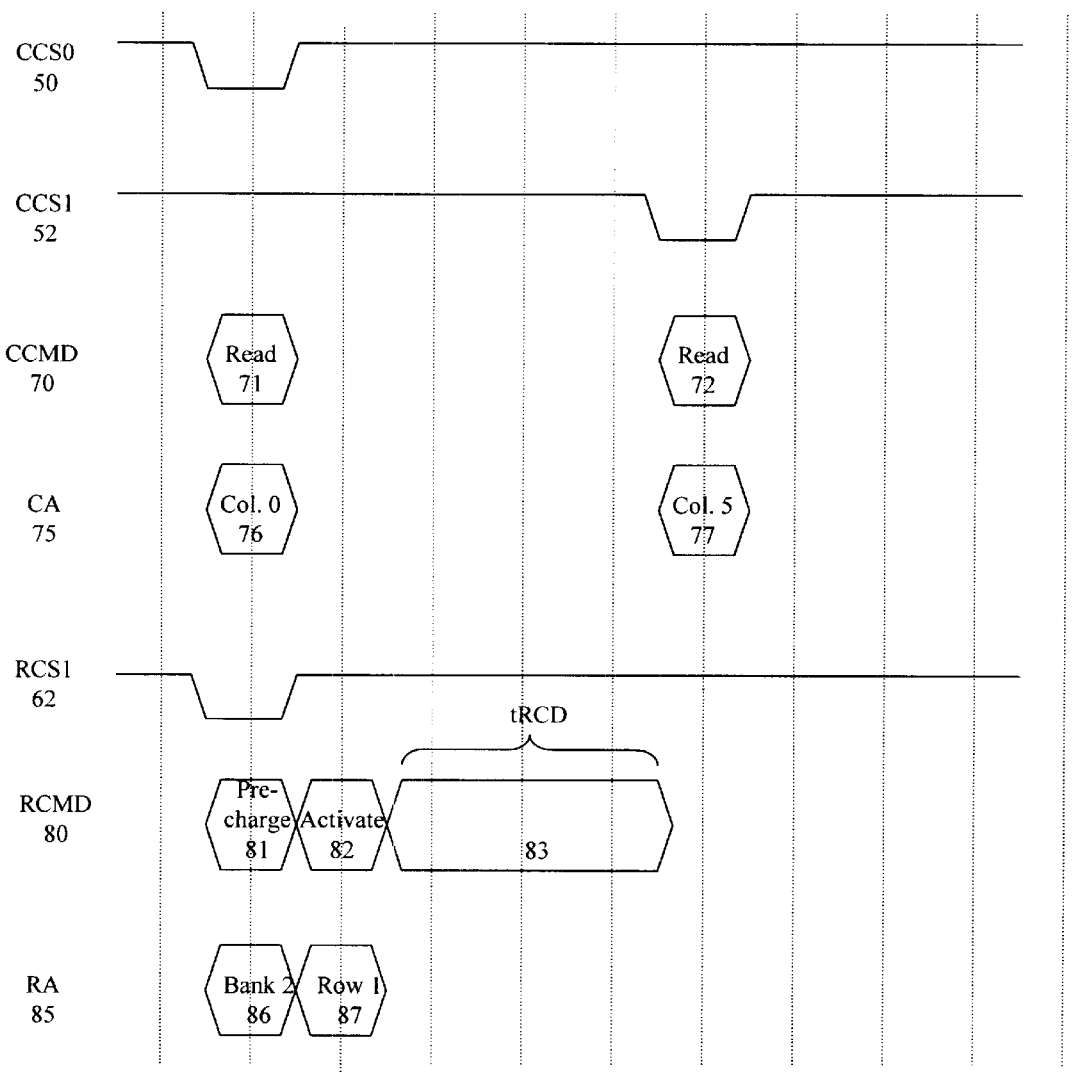
FIG. 5 shows an illustrative example of a timing diagram of a memory system according to an embodiment of the present invention.

FIG. 5 shows an illustrative example of a timing diagram of a memory system according to an embodiment of the present invention. The timing diagram illustrates the effect of providing concurrent row and column commands in embodiments of the present invention. In this example, the memory system directs a read for reading data residing in a particular portion of the memory device 130, or Rank 0, and then follows it with another read for reading data residing in another portion of the memory device 130. More specifically, the memory controller requests a first read for data contained in a page register that has data from Rank 0, Bank 0, Row 0, and requests a second read for data contained in Rank 1, Bank 2, Row 1, Column 5. In this case, the page register of Rank 1, Bank 2 is assumed to be currently occupied and pre-charge is required. Because the second read is not reading data already contained in the page register, Rank 1, Bank 2 has to be pre-charged and activated before data can be read from Rank 1, Bank 2.

The first signal in the timing diagram of FIG. 5 represents CCSO, which selects Rank 0, or memory device 130, and allows column commands to be performed on Rank 0 when CCSO is low. The second signal in the timing diagram represents CCS1, which selects Rank 1, or memory device 135, and allows column commands to be performed on Rank 1 when CCS1 is low. In other embodiments, the CCSO and CCS1 may be configured such that column commands are allowed to be performed on Rank 0 and Rank 1 when CCSO and CCS1 are high, respectively. The third signal represents column commands 70 ("CCMD"). The fourth signal in the timing diagram represents column addresses 75 ("CA"), which provides column addresses to be used in conjunction with the CCMD 70. For example, CA 75 may provide column addresses from which the data in the page register are to be read during a read operation. The fifth signal in the timing diagram represents RCS1, which selects Rank 1, or memory device 135, and allows row commands to be performed on Rank 1 when RCS1 is low. In other embodiments, the RCS1 may be configured such that row commands are allowed to be performed on Rank 1 when RCS1 is high. The sixth signal in the timing diagram represents row commands 80 ("RCMD"). The seventh signal in the timing diagram represents row addresses 85 ("RA"), which provides row addresses to be used in conjunction with the RCMD 80. For example, RA 80 may provide row addresses of the portion of the memory devices that needs to be pre-charged before a read operation can be performed on that portion.

In the illustrative example of FIG. 5, the memory controller 110 sends concurrent row and column commands, allowing row and column commands to be performed simultaneously. There is a column command read 71 in the CCMD 70 for reading data already contained in a page register In th ge register contains data in Rank 0, Bank 0, Row 0, which is obtained after pre-charging Rank 0, Bank 0 and activating Rank 0, Bank 0, Row 0. On the same clock that the column command read 71 is in the CCMD 70, a pre-charge command 81 is in the RCMD 80 for pre-charging Rank 1, Bank 2 to prepare it for a subsequent read operation. At this clock, CCSO is low, indicating that the column command read 71 is for Rank 0, and RCS1 also is low, indicating that the row command pre-charge is for Rank 1. A block 76 in the CA 75 provides the column address of the data to be read from Rank 0, Bank 0, Row 0. In this example, block 76 indicates "Column 0", so that data in Rank 0, Bank 0, Row 0, and Column 0 is read and extracted from Rank 0. A block 86 in the RA 85 provides the row address for which pre-charge is to be performed. In this example, the block 86 indicates "Bank 2", so that Rank 1, Bank 2 is pre-charged. Because of the dual chip selects and separate command and address lines for row operations and column operations, a row command and a column command do not have to be carried out sequentially. Instead, they can be issued concurrently in the same clock, for example, in 2.5 nanosecond in a 400-megahertz system. Assuming there are no conflicts, any two row and column operations can be simultaneously performed anywhere in the memory system on the same clock. Thus, the commands are issued in a more compact manner and command bandwidth is improved.

Because column and row commands can be issued simultaneously, a row command does not have to wait for a column command to be completed before the row command is issued. Sometimes it becomes advantageous to be able to issue a column command simultaneously with a row command, as illustrated in the example shown in FIG. 5. While reading a column from Rank 0, Bank 0, Row 0, the pre-charge command 81, which is followed by an activate command 82, is issued for pre-charging Rank 1, Bank 2. Because the row command pre-charge 81 does not have to follow the column command read 71, the next column command read 72 is issued one clock earlier than if the row command pre-charge 81 had to follow the column command read 71. This allows the column command read 72 to be pulled in by one clock, which translates into an earlier transmission of the next read-data in the data bus lines. In other words, concurrent row and column operations allow the second read command 72 to be issued faster after the first read command 71 is issued. This compresses commands travelling through the CCMD 70, improving command bandwidth.

Data bandwidth is also improved because the time in which data is not present on the data bus lines is decreased. The data bus lines are busy when data are transmitting through them. In the example shown in FIG. 5, the data bus lines are busy when the first read command 71 is issued and when the second read command 72 is issued to transmit the first read-data and the second read-data to the memory controller 110, respectively. However, in between the first read command 71 and the second read command 72, the data bus lines are not busy because Rank 1, Bank 2 has to be activated and the timing constraint tRCD has to elapse before Rank 1, Bank 2 can accept the second read command 72. In FIG. 5, block 82 in the RCMD 80 represents an activate command and the length of the block 83 represents the length of the tRCD timing constraint. The block 87 in RA 85 provides a full row address, "Row 1", for the activate command 82 to activate Rank 1, Bank 2, Row 1. The second read command 72 is provided with column addresses "Column 5" in block 77 for reading data in Rank 1, Bank 2, Row 1, Column 5. By issuing the row command pre-charge 81 in conjunction with the column command read 71, Rank 1, Bank 2 is ready for accepting the second read command 72 a clock earlier, and thus the second read-data is transmitted to the memory controller 110 through the data bus lines a clock earlier. Therefore, data bandwidth is more efficiently used because the data bus lines are kept busier in embodiments of the present invention.

In other implementations, concurrent row and command operations further improve the data bandwidth. For example, instead of having the timing block 81 containing a pre-charge command in the RCMD 80 at the same clock the RCS1 62 goes low in FIG. 5, an activate command is in the timing block 81. The timing block 86 in RA 85 would then provide a full row address of the row to be activated. In this case, a pre-charge command would be carried out in a previous clock before the RCS1 62 goes low. Two clocks are saved in this situation, and the data bus lines become even more compact and more efficiently used. Moreover, other column commands, such as write commands, can also be implemented between the first column command read 71 and second column command read 72, further compressing commands in the command signal lines and increasing command bandwidth. Therefore, data bandwidth is further improved.

Figure 6:
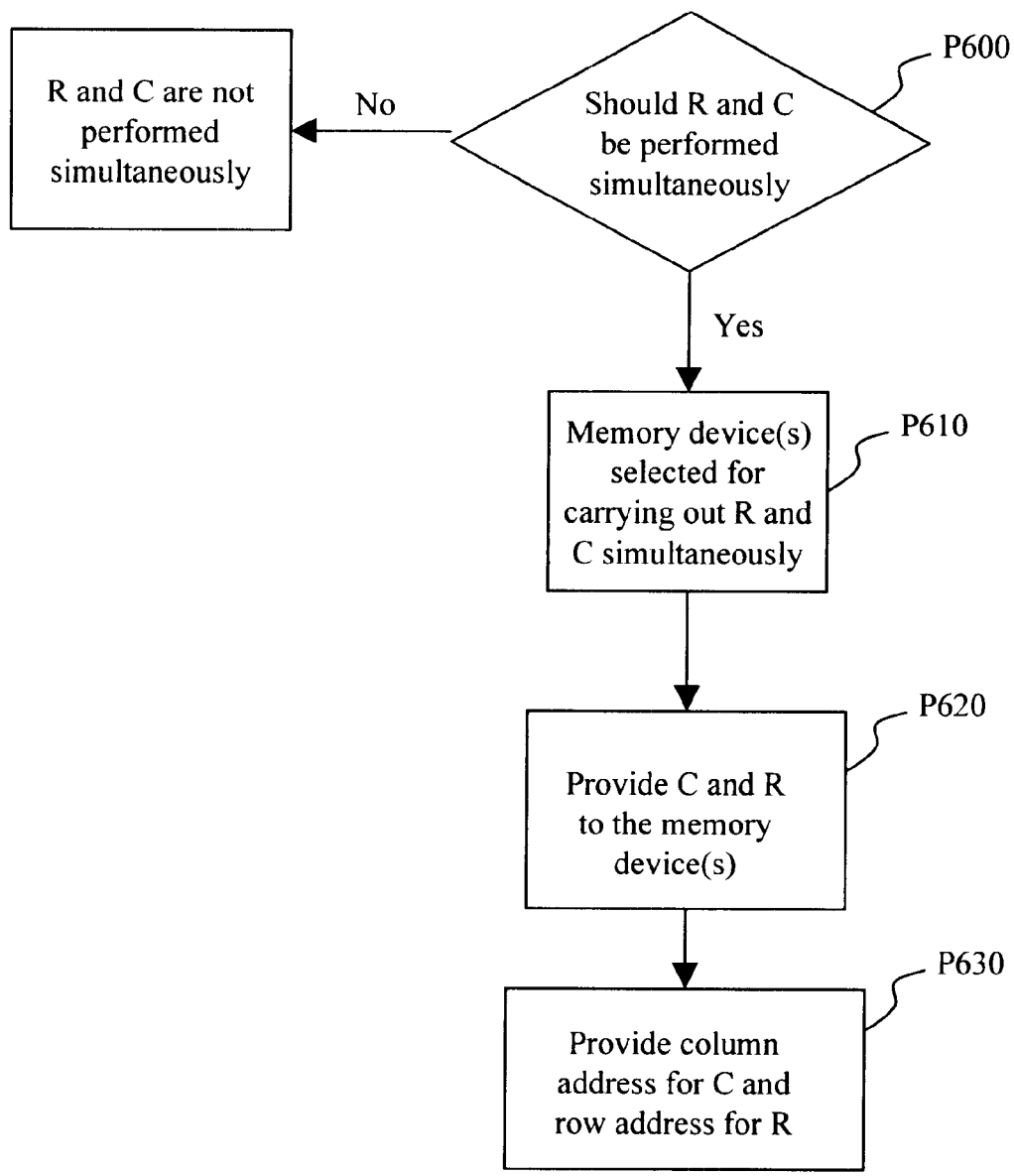
FIG. 6 illustrates processes for operating a memory system according to an embodiment of the present invention.

FIG. 6 illustrates processes for operating a memory system to provide concurrent row and column commands according to an embodiment of the present invention. The memory system includes a memory controller, memory devices, and separate selection mechanisms to each memory device for providing concurrent row and column operations in the memory system. In block P600, the memory system decides if a row command R and a column command C should be simultaneously performed. In one embodiment, the row command R and column command C may be performed simultaneously in a particular memory device. In other embodiments, concurrent row and column commands R, C may go to different memory devices, with the row command R being performed on a first memory device and the column command C being performed on a second memory device. In block P610, if row command R and column command C are to be performed concurrently in a memory device or different memory devices, the memory device or memory devices are selected for carrying out the column command C and the row command R. In one implementation, the memory device or each of the different memory devices is referred to as a Rank and is further divided into sub-arrays, which are referred to as Banks. The column command C is directed to operation in one Bank, while the row command R is directed to operation in another Bank. In block P620, column command C and row command R are provided to the memory device or different memory devices. In block P630, column address(es) for the column command C and row address(es) for the row command R are provided to the memory device or different memory devices. Although blocks P610, P620 and P630 are illustrated as separated from each other in FIG. 6, they may be combined together and be performed at the same clock. With separate selection mechanisms to each memory devices, commands from block P620 and addresses from block P630, row and column commands are issued simultaneously and concurrent row and column operations are performed within the memory system.

While the description above refers to particular embodiments of the present invention, it will be understood that many modifications may be made without departing from the spirit thereof. For example, instead of providing a row chip select and a column chip select to a Rank, a row chip select and a column chip select are provided to each or selective Banks within a Rank. This allows each or selective Banks to be controlled separately, further increasing command bandwidth and more efficiently using the data bandwidth by compressing commands travelling through the command signal lines and data travelling through the data bus lines. In another example, commands such as power down entry or self-refresh entry can be assigned as row commands. This allows the present memory system to issue a column command read or write to one Rank while waking another Rank from a power-down state with the issuance of a row command. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A memory system, comprising:
   a memory controller that sends data and signals to at least one memory device and receives data and signals from the at least one memory device;
   an external buffer interconnecting the memory controller and the at least one memory device to transfer data and signals between the memory controller and the at least one memory device;
   a first selecting communication path that provides a first selecting signal to the at least one memory device for selection to carry out a column command; and
   a second selecting communication path that provides a second selecting signal to the at least one memory device for selection to simultaneously carry out a row command with the column operation.

2. The memory system of claim 1, further comprising
a column command communication path that provides column commands to the memory device;
a column address communication path that provides column addresses for the column commands to the memory device;
a row command communication path that provides row commands to the memory device; and
a row address communication path that provides row addresses for the row commands to the memory device.

3. The memory system of claim 1, wherein the at least one memory device having the memory cell array is referred to as a rank, and the at least one memory device is further divided into a plurality of sub-arrays referred to as banks, the rank having at least a first bank and a second bank.

4. The memory system of claim 3, wherein the first selecting communication path provides a first selecting signal to the rank for carrying out a column command in the first bank, and the second selecting communication path provides a second selecting signal to the rank for simultaneously carrying out a row command in the second bank with the column operation.

5. The memory system of claim 1, wherein the column commands include a read command for reading data from the at least one memory device and a write command for writing data to the at least one memory device.

6. The memory system of claim 1, wherein the row commands include a pre-charge command for pre-charging the at least one memory device, or a portion thereof, an activate command for activating a portion of the at least one memory device, a power-down command for moving the at least one memory device, or a portion thereof, to a lower power state, and a self-refresh command for refreshing the at least one memory device, or a portion thereof.

7. A method of providing concurrent row and column commands in a memory system including a memory controller and at least one memory device having a memory cell array, the method comprising:
selecting the at least one memory device for carrying out a column operation in the memory cell array;
selecting the at least one memory device for simultaneously carrying out a row operation in the memory cell array With the column operation;
providing column commands for the column operation to the at least one memory device through an external buffer interconnecting the memory controller and the at least one memory device;
providing column addresses for the column commands to the at least one memory device through the external buffer interconnecting the memory controller and the at least one memory device;
providing row commands for the row operation to the at least one memory device through the external buffer interconnecting the memory controller and the at least one memory device; and
providing row addresses for the row commands to the at least one memory device through the external buffer interconnecting the memory controller and the at least one memory device.

8. The method of claim 7, wherein the at least one memory device includes a plurality of memory devices, each memory device being coupled to the memory controller by a first selecting communication path and a second selecting communication path, the first selecting communication path providing a first selecting signal to the memory device for selection to carry out a column command in its memory cell array, the second selecting communication path providing a second selecting signal to the memory device for selection to simultaneously carry out a row command in its memory cell array with the column operation.

9. The method of claim 7, wherein the at least one memory device having the memory cell array is referred to as a rank, and the at least one memory device is further divided into a plurality of sub-arrays referred to as banks, the rank having at least a first bank and a second bank.

10. The memory system of claim 9, wherein the column operation is carried out in the first bank of the memory device and the simultaneous row operation is carried out in the second bank.

11. The memory system of claim 7, wherein the column commands include a read command for reading data from the at least one memory device and a write command for writing data to the at least one memory device.

12. The memory system of claim 7, wherein the row commands include a pre-charge command for pre-charging the at least one memory device, or a portion thereof, an activate command for activating a portion of the at least one memory device, a power-down command for moving the at least one memory device, or a portion thereof, to a lower power state, and a self-refresh command for refreshing the at least one memory device, or a portion thereof.

13. A computer readable medium for use in conjunction with a memory system including a memory controller and at least one memory device having a memory cell array, the computer readable medium including computer readable instructions encoded thereon for:
selecting the at least one memory device for carrying out a column operation in the memory cell array;
selecting the at least one memory device for simultaneously carrying out a row operation in the memory cell array with the column operation;
providing column commands for the column operation. to the at least one memory device through an external buffer interconnecting the memory controller and the at least one memory device;
providing column addresses for the column commands to the at least one memory device through the external buffer interconnecting the memory controller and the at least one memory device;
providing row commands for the row operation to the at least one memory device through the external buffer interconnecting the memory controller and the at least one memory device; and
providing row addresses for the row commands to the at least one memory device through the external buffer interconnecting the memory controller and the at least one memory device.

14. The computer readable medium of claim 13, wherein the at least one memory device includes a plurality of memory devices, each memory device being coupled to the memory controller by a first selecting communication path and a second selecting communication path, the first selecting communication path providing a first selecting signal to the memory device for selection to carry out a column command in its memory cell array, the second selecting communication path providing a second selecting signal to the memory device for selection to simultaneously carry out a row command in its memory cell array with the column operation.

15. The computer readable medium of claim 13, wherein the at least one memory device having the memory cell array is referred to as a rank, and the at least one memory device is further divided into a plurality of sub-arrays referred to as banks, the rank having at least a first bank and a second bank.

16. The computer readable medium of claim 15, wherein the column operation is carried out in the first bank of the memory device and the simultaneous row operation is carried out in the second bank.

17. The computer readable medium of claim 13, wherein the column commands include a read command for reading data from the at least one memory device and a write command for writing data to the at least one memory device.

18. The computer readable medium of claim 13, wherein the row commands include a pre-charge command for pre-charging the at least one memory device, or a portion thereof, an activate command for activating a portion of the at least one memory device, a power-down command for moving the at least one memory device, or a portion thereof, to a lower power state, and a self-refresh command for refreshing the at least one memory device, or a portion thereof.

\* \* \* \* \*